US011977862B2

(12) United States Patent
Battaglia et al.

(10) Patent No.: US 11,977,862 B2
(45) Date of Patent: May 7, 2024

(54) AUTOMATICALLY CATALOGING APPLICATION PROGRAMMING INTERFACE (API)

(71) Applicant: salesforce.com, inc., San Francisco, CA (US)

(72) Inventors: Martin Battaglia, Buenos Aires (AR); Alvaro Gaita, Buenos Aires (AR); Leandro Bauret, Buenos Aires (AR); Marc Thurley, Buenos Aires (AR); Jing Li, San Francisco, CA (US); Elizabeth Coelho, Seattle, WA (US); Peter Gorski, Burlingame, CA (US); Eduardo Cominguez, Buenos Aires (AR)

(73) Assignee: Salesforce, Inc., San Francisco, CA (US)

( * ) Notice: Subject to any disclaimer, the term of this patent is extended or adjusted under 35 U.S.C. 154(b) by 10 days.

(21) Appl. No.: 17/527,274

(22) Filed: Nov. 16, 2021

(65) Prior Publication Data

US 2023/0092030 A1 Mar. 23, 2023

Related U.S. Application Data

(60) Provisional application No. 63/246,057, filed on Sep. 20, 2021.

(51) Int. Cl.
*G06F 9/44* (2018.01)
*G06F 8/10* (2018.01)
(Continued)

(52) U.S. Cl.
CPC .............. *G06F 8/36* (2013.01); *G06F 8/10* (2013.01); *G06F 8/71* (2013.01)

(58) Field of Classification Search
None
See application file for complete search history.

(56) References Cited

U.S. PATENT DOCUMENTS 11,360,993 B1 * 6/2022 Prasad ................... G06F 9/541
2014/0366000 A1 * 12/2014 Batabyal ................ G06F 8/61
717/120

(Continued)

*Primary Examiner* — Wei Y Zhen
*Assistant Examiner* — Lanny N Ung
(74) *Attorney, Agent, or Firm* — Sterne, Kessler, Goldstein & Fox P.L.L.C.

(57) ABSTRACT

Disclosed herein are system, method, and computer program product embodiments for automatically cataloging updated Application Programming Interface (API) specifications. The API specifications may have been previously published to an application exchange platform. An automatic cataloging tool installed at an API development system may identify an updated API specification committed to an API specification repository. To validate that a change has been made, the automatic cataloging tool may compare the updated specification, metadata, and/or referenced documentation files to an API specification previously posted to the application exchange platform. In response to determining that the API specifications differ, the automatic cataloging tool may transmit the updated API specification to the application exchange platform. The application exchange platform may then replace the previous API specification with the updated API specification for client devices to view.

20 Claims, 5 Drawing Sheets

(51) Int. Cl.
*G06F 8/36* (2018.01)
*G06F 8/71* (2018.01)

(56) References Cited

U.S. PATENT DOCUMENTS

| | | | |
|---|---|---|---|
| 2015/0324178 A1* | 11/2015 | Arnold | G06F 8/48 |
| | | | 717/121 |
| 2017/0337052 A1* | 11/2017 | Elkabany | G06F 8/71 |
| 2017/0371937 A1* | 12/2017 | Shah | G06F 8/71 |
| 2020/0133744 A1* | 4/2020 | Macleod | G06F 9/54 |
| 2021/0133089 A1* | 5/2021 | Khillar | G06F 16/9024 |
| 2022/0057999 A1* | 2/2022 | Pitchai Muthu | G06F 8/30 |

* cited by examiner

AUTOMATICALLY CATALOGING APPLICATION PROGRAMMING INTERFACE (API)

CROSS-REFERENCE TO RELATED APPLICATIONS

This application claims priority to U.S. Provisional Patent Application No. 63/246,057 filed on Sep. 20, 2021, which is incorporated by reference herein in its entirety.

BACKGROUND

Technical Field

One or more implementations relate to the field of Application Programming Interfaces (APIs); and more specifically, to the automatic cataloging of API specifications during a development lifecycle.

Background Art

As connectivity between computer and mobile devices continues to develop, applications have been developed that communicate and share information. Commonly, applications may communicate via an Application Programming Interface (API). An API is a software interface offering a service to other programs to communicate data. To describe or standardize the communication protocol for an API, API developers provide an API specification. The API specification details how to use or interface with an API for communication. For example, the API specification may define API objects, values and parameters, how the API objects are called, and what each object does. The API specification may also indicate relationships between the objects and how each object can be used. A computer system that utilizes this specification is said to implement or expose an API.

As APIs continue to be developed and utilized, many large enterprise organizations may develop or implement dozens or even hundreds of APIs. These APIs may exist at varying stages of an API development lifecycle. For example, some APIs may have been publically released and implemented by customers or consumers; some APIs may be released as a test build or beta; and other may be still in internal testing or development. For the APIs that have been released, developers may continue updating or patching APIs with newer versions. While new API implementation code may be released, developers may neglect the maintenance of updating public API documentation, such as the API specification. This may lead to inconsistencies between a public API specification and an API implementation. For example organizations that are managing or updating multiple APIs that are in public use or that have been published to an application exchange may face difficulties cataloging and publishing API specifications that may be scattered across multiple repositories.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for automatically cataloging Application Programming Interface (API) specifications.

In some embodiments, an API development system implements an automatic cataloging tool to validate and catalog API specifications. The automatic cataloging tool may be implemented using a command line interface (CLI) and/or an application service. The validation and cataloging of API specifications may correspond to updated API specifications that have previously been published on an application exchange platform implemented on an application exchange system. The application exchange platform may be an application marketplace or online store allowing consumers to install, implement, and/or download applications, which may include services, software, extensions, and/or programs. The applications may have corresponding APIs with API specifications. The application exchange platform publishes the API specifications for viewing and/or use by consumers or implementers of the API.

The automatic cataloging tool implemented at an API development system analyzes API specifications which have been drafted and/or updated by developers. The automatic cataloging tool then validates the API specification. Validation may include identifying additional metadata, such as tags, categories, ownership data, and/or other metadata used for cataloging and publishing the API specification. Validation may also include identifying additional dependencies such as additionally referenced documents or markdown documents referenced by an API specification. Upon validating an updated API specification, the automatic cataloging tool transmits updated API specifications to the application exchange platform for publication.

To catalog an updated API specification, the automatic cataloging tool may analyze a descriptor file implemented at the API development system. An administrator uses the descriptor file to designate APIs to be monitored and/or cataloged. The administrator may be DevOps engineer and/or an administrator responsible for software development and/or IT operations. The administrator may integrate the automatic cataloging tool and descriptor file with an existing API development pipeline to automatically validate and catalog updated API specifications. The automatic cataloging tool interfaces with the application exchange system to provide the updated API specifications for publication.

Implementing the automatic cataloging tool may provide a process for efficiently publishing updated API specifications. For example, an API specification and other corresponding documents may be divided and/or stored in multiple different repositories by an API development system. The automatic cataloging tool may automatically identify the relevant files and/or documents corresponding to an API specification, validate the API specification, and publish the updated API specification to an application exchange system. In this manner, the automatic cataloging tool more efficiently manages API specification files and data in computer systems and/or enterprise computer systems.

Additionally, implementing the automatic cataloging tool in a development pipeline provides continuous integration and continuous deployment (CI/CD) of updated API implementations. As developers continue to update API implementations or release new versions, the automatic cataloging tool may continue to publish updated API specifications. By implementing the automatic cataloging tool, API development systems may streamline the deployment and publication of new API versions. Further, implementing the automatic cataloging tool allows developers to focus on building and implementing APIs. This automation and self-discovery of updated API specifications may reduce wasted computer resources corresponding to developer intervention.

Various embodiments of these features will now be discussed with respect to the corresponding figures.

Figure 1:
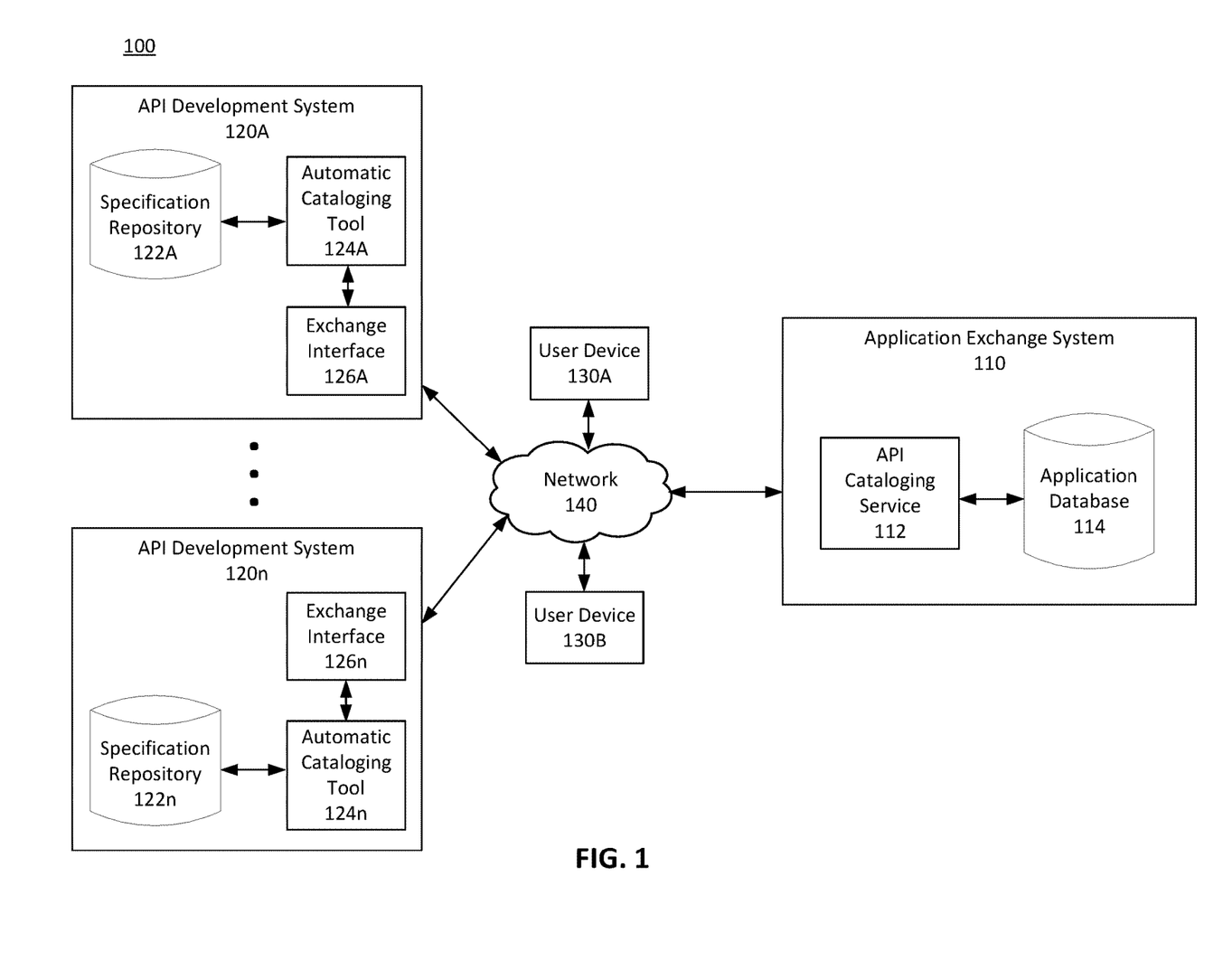
FIG. 1 depicts a block diagram of an Application Programming Interface (API) specification cataloging environment, according to some embodiments.

FIG. 1 depicts a block diagram of an Application Programming Interface (API) specification cataloging environment 100, according to some embodiments. API specification cataloging environment 100 includes application exchange system 110, API development systems 120, user device 130, and/or network 140.

Application exchange system 110 may be implemented using computer system 500 as further described with reference to FIG. 5. For example, application exchange system 110 may be implemented using one or more servers and/or databases. Application exchange system 110 may communicate with user devices 130 and/or API development systems 120 over network 140. Network 140 may include any combination of Local Area Networks (LANs), Wide Area Networks (WANs), and/or the Internet.

Application exchange system 110 may provide an application exchange platform. The application exchange platform may be an application marketplace or online store allowing consumers to install, implement, and/or download applications, which may include services, software, extensions, and/or programs. The application exchange platform may also be a cloud-based application marketplace. This may allow users to identify applications to implement into cloud-based computing platforms. The applications may have corresponding APIs with API specifications. Application exchange system 110 publishes the API specifications on the application exchange platform for viewing and/or use by consumers or implementers of the API.

The consumers or implementers may use a user device 130 to access application exchange system 110 via network 140. User device 130 may be a desktop personal computer, workstation, laptop, Personal Digital Assistant (PDA), smartphone, smartwatch, wearable device, augmented reality (AR) device, virtual reality (VR) device, and/or computer system 500. Using user device 130, users may access application exchange system 110 to view or browse applications, APIs, and/or API specifications. Application exchange system 110 may generate one or more graphical user interfaces (GUIs) for display on user device 130 to display data corresponding to the applications, APIs, and/or API specifications. Application exchange system 110 may store this data in application database 114. When a user device 130 accesses application exchange system 110, API specification data may be retrieved from application database 114, formatted, and transmitted to user device 130 for viewing. User device 130 may also install, implement, and/or download applications via the GUIs. The applications may utilize the APIs corresponding to the API specifications.

To receive and/or store API specifications and/or updated API specifications, application exchange system 110 includes an API cataloging service 112. API cataloging service 112 receives updated API specifications from API development systems 120. API cataloging service 112 stores the updated API specifications in application database 114. In some embodiments, API cataloging service 112 may be a messaging interface configured to exchange messages and/or data packets with API development system 120. In some embodiments, API cataloging service 112 may be an API utilized by an API development system 120 to provide the updated API specification.

One or more API development system 120 may provide updated API specifications to application exchange system 110. An API development system 120 may be a computer system, a cloud-computing system, an enterprise system, a server, and/or other computer device allowing an API developer to draft an API specification. In some embodiments, an API development system 120 may be implemented using computer system 500 as further described with reference to FIG. 5.

To provide the updated API specification, an API development system 120 may use an exchange interface 126 and/or an automatic cataloging tool 124. Exchange interface 126 may communicate with API cataloging service 112 to validate API specifications and/or to provide update API specifications. In some embodiments, exchange interface 126 may also provide API implementation code as well. As previously explained, API cataloging service 112 may be a messaging interface configured to exchange messages and/or data packets with API development system 120. This may occur via exchange interface 126. In some embodiments, API cataloging service 112 may be an API utilized by an API development system 120 to provide the updated API specification. Exchange interface 126 may access and use an API provided by API cataloging service 112 to provide other API specifications.

To provide updated API specifications, the exchange interface 126 may implement the automatic cataloging tool 124 previously described. The automatic cataloging tool 124 may be implemented using a command-line interface (CLI) and/or a service or program executed by the API development system 120. In some embodiments, an administrator of API development system 120 may implement the automatic cataloging tool 124 in an API development pipeline to provide continuous integration and continuous deployment (CI/CD) of updated API implementations. The administrator may be DevOps engineer and/or an administrator responsible for software development and/or IT operations.

In some embodiments, the administrator may use a descriptor file to designate APIs to be monitored and/or cataloged. The descriptor file may identify APIs and/or their corresponding API specification files stored in specification repository 122. Specification repository 122 may be one or more memory devices or databases storing elements of an API specification. In some embodiments, elements of an API specification may be stored in multiple specification repositories 122 corresponding to an API development system 120. For example, while specification repository 122A is depicted as a single memory device, specification repository 122A may be implemented as multiple memory devices storing different components or elements of an API specification. Further, different API development systems 120 may have different specification repository 122 configurations. The API specification may be divided and/or segmented into different files. The descriptor file generated at an API development system 120 may designate the one or more specification repositories 122 including the one or more API specification files.

The descriptor file may also identify metadata complementing the API and/or the API specification. This metadata may be used by application exchange system 110 to catalog and/or organize the API and/or the publication of the API specification to the application exchange platform. In some embodiments, the descriptor file and/or the API specification may include the metadata. The metadata may include, for example, tags, categories, ownership data, and/or other metadata used for cataloging and publishing the API specification. The automatic cataloging tool 124 may use this metadata when validating, cataloging, and/or publishing the API specification. In this manner, the automatic cataloging tool 124 may identify the API specifications and/or metadata specified in the descriptor file to automatically catalog the specified API specifications. In some embodiments, automatic cataloging tool 124 may apply an auto-discovery of candidate APIs.

To validate, catalog, and/or publish an updated API specification, the automatic cataloging tool 124 may analyze the descriptor file, which specifies APIs for updating. The automatic cataloging tool 124 and descriptor file may be integrated with an existing API development pipeline to automatically validate and catalog updated API specifications. For example, when a developer updates an API specification using API development system 120, the automatic cataloging tool 124 identifies the update based on the API's designation in the descriptor file. The automatic cataloging tool 124 may track and/or monitor the APIs designated in the descriptor file. Based on this tracking, when a developer saves and/or commits a change to the API specification as stored in specification repository 122, the automatic cataloging tool 124 validates the updated API specification in preparation for publishing.

To validate the API specification, the automatic cataloging tool 124 may analyze the metadata corresponding to an API specification and/or any additional files referenced by the API specification. For example, the metadata may designate additional documentation files, dependencies, and/or a tree of dependencies. In some embodiments, the documentation files, dependencies, and/or tree of dependencies may be referenced within the API specification. For example, the body of the API specification may refer to other files as part of the API specification. In some embodiment, documentation files may be markdown documents. If the API specification and/or the documentation files references other files, such as images, API development system 120 may store these files in specification repository 122.

The API specification may also include dependencies. The automatic cataloging tool 124 may validate these dependencies. Dependencies may refer to those files and/or data relied upon by an API specification. For example, the API specification may refer to and/or incorporate a data file. In this manner, the API specification may depend on the data file. A tree of dependencies may refer to multiple dependency files. For example, the API specification may depend on data file A, but data file A depends on data file B. The automatic cataloging tool 124 may resolve and/or retrieve these dependencies when analyzing or validating the API specification.

To validate the API specification, the automatic cataloging tool 124 may compare the updated API specification to a version of the API specification previously published by application exchange system 110. For example, the automatic cataloging tool 124 may identify the changes to the API specification, changes to any metadata, and/or changes to any additional documentation files and/or dependencies. If the API specification is divided into multiple files and/or stored on different specification repositories 122, the automatic cataloging tool 124 may also gather and assemble these components to generate the API specification. For example, automatic cataloging tool 124 may assemble a plurality of files corresponding to the API specification. These plurality of files may be stored on a plurality of specification repositories 122. The automatic cataloging tool 124 may compare the API specification, the metadata, and/or reference documentation files with the previously published API specification to determine that there has been a change. This process may validate the API specification even when the different API specification components may be stored in different specification repositories 122. In some embodiments, the validation may be optional.

Upon determining that a change to an API specification has been saved and/or committed, the automatic cataloging tool 124 interfaces with the application exchange system 110 via exchange interface 126 to provide the updated API specification for publication. Exchange interface 126A may transmit the updated API specification to API cataloging service 112. In some embodiments, exchange interface 126 may transmit an updated API specification to replace an existing published API specification. In some embodiments, exchange interface 126 may transmit the updated and/or edited portions of the updated API specification. API cataloging service 112 may store the updated API specification on application database 114. API cataloging service 112 may also published the updated API specification to an application exchange platform provided by application exchange system 110.

While the automatic cataloging tool 124 may analyze the updated API specification at API development system 120, in some embodiments, API cataloging service 112 may perform the analysis. For example, a potentially updated API specification may be committed and/or deployed at API development system 120. Exchange interface 126 may automatically notify application exchange system 110 of this update and/or provide the updated API specification. API cataloging service 112 may validate the updated API specification to determine whether a change has been made prior to publishing the updated API specification.

In some embodiments, application exchange system 110 may interface with API development systems 120 corresponding to the same organization or enterprise system and/or corresponding to different organizations or enterprise systems. When receiving updated API specifications from different API development systems 120, application exchange system 110 may format and/or present the different API specifications on the application exchange platform for users to view.

This may occur even when different API development systems 120 use different API development formats. For example, API development system 120A may use a GitHub platform to define an API and/or an API specification. API development system 120*n* may use local files and/or a different formatting structure. The automatic cataloging tool 124 implemented at API development systems 120A, 120*n*, however, is still configured to analyze updated API specifications and provide the updated API specifications to application exchange system 110. In this manner, the automatic cataloging tool 124 may be implemented into different API development systems 120 using different documentation and/or API development formats. Application exchange system 110 is still able to receive updated API specifications from the automatic cataloging tools 124 deployed at each API development system 120. Application exchange system 110 is then able to publish these updated API specifications within its application exchange for public access.

Figure 2:
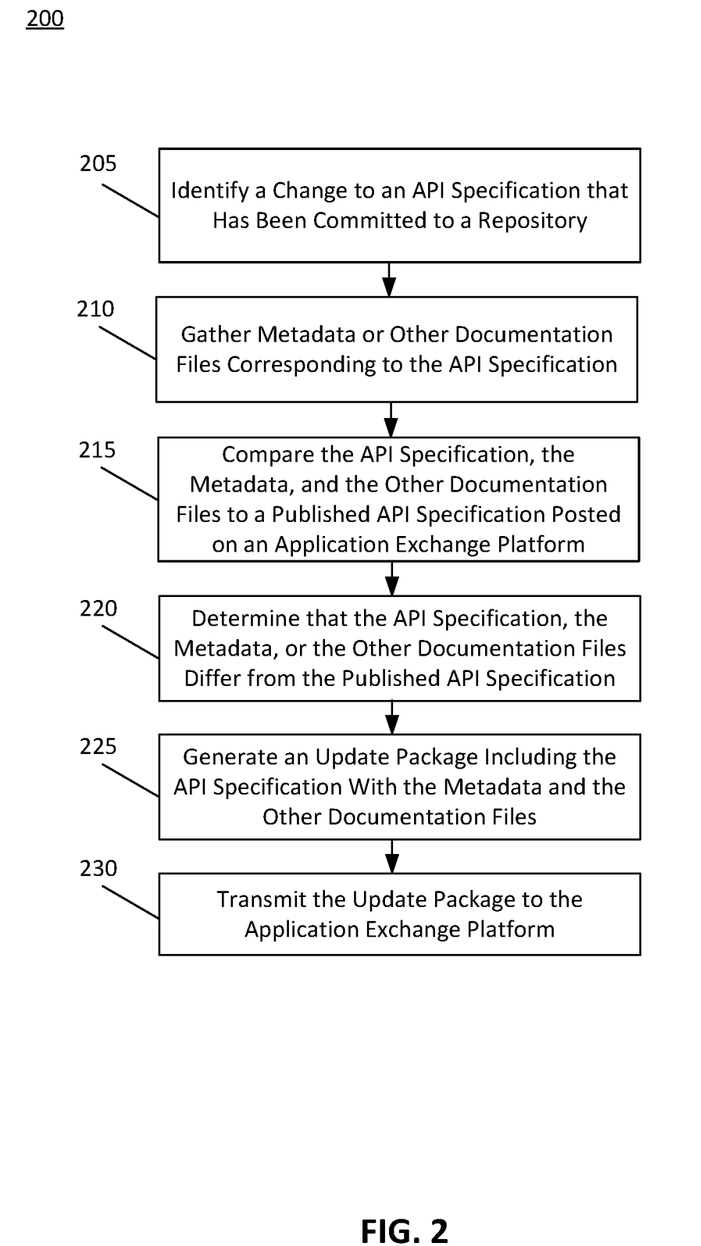
FIG. 2 depicts a flowchart illustrating a method for cataloging an API specification at an API development system, according to some embodiments.

FIG. 2 depicts a flowchart illustrating a method 200 for cataloging an API specification at an API development system 120, according to some embodiments. Method 200 shall be described with reference to FIG. 1; however, method 200 is not limited to that example embodiment.

In an embodiment, automatic cataloging tool 124 may utilize method 200 to identify and validate an updated API specification. The foregoing description will describe an embodiment of the execution of method 200 with respect to automatic cataloging tool 124. While method 200 is described with reference to automatic cataloging tool 124, method 200 may be executed on any computing device, such as, for example, the computer system described with reference to FIG. 5 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 2, as will be understood by a person of ordinary skill in the art.

At 205, automatic cataloging tool 124 may identify a change to an API specification that has been committed to a repository. The repository may be specification repository 122. Automatic cataloging tool 124 may identify an updated API specification that has been committed to the specification repository 122. As previously explained, automatic cataloging tool 124 may identify a change to the API specification based on a descriptor file designating the API for specification cataloging. In some embodiments, an administrator and/or an API developer may define and/or store a descriptor file in specification repository 122. By using the descriptor file, automatic cataloging tool 124 may identify the particular APIs for specification cataloging. Automatic cataloging tool 124 may also gather dependencies based on dependency designations in the descriptor file.

In some embodiments, automatic cataloging tool 124 may trigger a check to determine whether an API specification has been updated when an API specification is saved. For example, an API developer may save and/or commit an updated API specification using a GUI data object on the API developer's client device. For example, a GUI data object corresponding to the API documentation platform or a GUI data object specific to the automatic cataloging tool 124 may be selected to commit an updated API specification. When either GUI data object is selected, automatic cataloging tool 124 may identify the saved API specification for comparison with a descriptor file. In some embodiments, a particular folder may be designated in specification repository 122 for triggering automatic cataloging tool 124. When a developer places one or more API specification files in the folder, automatic cataloging tool 124 may trigger to validate and/or publish the updated API specification.

When automatic cataloging tool 124 is triggered, automatic cataloging tool 124 may compare the update API specification to a previously defined descriptor file. As previously explained, this descriptor file may designate APIs for cataloging. If the API specification experiencing the change matches an API designated by the descriptor file, automatic cataloging tool 124 may proceed to 210 to validate and/or transmit the updated API specification to the application exchange platform. If the API does not correspond to one designated by the descriptor file, automatic cataloging tool 124 may not perform a validation and/or transmission. This may be the case where a developer is continuing to work on or develop an API specification and is not yet ready to publish an updated API specification.

In some embodiments, the descriptor file may indicate when automatic cataloging tool 124 is to trigger to identify updated API specifications. For example, the descriptor file may designate a periodicity for triggering automatic cataloging tool 124. When triggered, automatic cataloging tool 124 may check the APIs and corresponding repositories designated in the descriptor file for updated API specifications. Automatic cataloging tool 124 may then validate and/or transmit the updated API specification to application exchange system 110. In some embodiments, the designation of APIs in the descriptor file may trigger automatic cataloging tool 124 to check for an updated API specification whenever a change is saved and/or committed. For example, the descriptor file may designate APIs for automatic cataloging tool 124 to monitor.

In some embodiments, automatic cataloging tool 124 may identify an updated API specification based on automatic discovery. The automatic cataloging tool 124 may operate in a "convenience mode." In this case, an application developer may not be required to trigger automatic cataloging tool 124. Instead, a portion of the development pipeline may be altered for automatic discovery of APIs in specification repository 122. In some embodiments, this may be a check of multiple and/or all specification repositories 122 for a given API development system 120. In this case, a check may be performed when a pipeline is run. Automatic cataloging tool 124 may automatically discover changes to the API specification during the execution of the pipeline.

At 210, automatic cataloging tool 124 may gather metadata or other documentation files corresponding to the API specification. This may occur in response to automatic cataloging tool 124 identifying that an API specification has changed. To gather the metadata, automatic cataloging tool 124 may analyze the descriptor file identifying the API and/or the API specification. In some embodiments, automatic cataloging tool 124 may identify metadata from one or more files of the API specification. Similarly, automatic cataloging tool 124 may determine other documentation files corresponding to the API specification. These files may be specified in the descriptor file. In some embodiments, the documentation files may be specified by the API specification. For example, this may occur when the API specification has dependencies. Automatic cataloging tool 124 may also resolve a tree of dependencies when multiple files are referenced. In some embodiments, a web API parser tool may resolve the tree of dependencies to determine which files are referenced. The other documentation files may include referenced documents, images, and/or other data file types incorporated into the API specification. In some embodiments, the other documentation files may include portions of the API specification that have been divided. These portions may have been stored in different specification repositories 122. Automatic cataloging tool 124 may gather the metadata and/or other documentation files from the different specification repositories 122. By gathering the metadata and/or other documentation files corresponding to the API specification, automatic cataloging tool 124 may formulate the API specification.

At 215, automatic cataloging tool 124 may compare the API specification, the metadata, and the other documentation files to a published API specification posted on an application exchange platform. For example, automatic cataloging tool 124 may compare the content of the API specification committed to specification repository 122 to the content of the published API specification determine if the content differs. The published API specification may also include corresponding metadata and/or other documentation files. This comparison may determine whether the API specification, metadata, and/or other documentation files have changed relative to the published API specification posted on the application exchange platform. When comparing documentation files, automatic cataloging tool 124 may compare a first file referenced in the API specification with a second file referenced in the published API specification. The first file may be an updated version of the second file. When the first and second file differ, automatic cataloging tool 124 may designate the API specification as differing from the published API specification. In some embodiments, this comparison may be performed by hashing the API specifications, metadata, and/or other documentation files and comparing the resulting hashes to determine if a difference exists.

At 220, automatic cataloging tool 124 may determine that the API specification, the metadata, or the other documentation files differ from the published API specification. This difference may indicate that an updated API specification has been committed. If the content of the API specification, metadata, and/or other documentation files have changed, this may indicate that the published API specification should be updated. Updating the API specification content, metadata, and/or other documentation files may provide the public with an updated API specification for implementing an API corresponding to API development system 120. In some embodiments, this determination may correspond to a validation that the API specification has changed. This validation may be confirmed based on a change of the API specification content, the metadata, and/or the other documentation files referenced in the API specification. This validation may also validate dependencies and/or a tree of dependencies. If a dependency has changed, automatic cataloging tool 124 may also recognize this change as a difference in the API specification. For example, automatic cataloging tool 124 may determine that a file from a plurality of files forming the dependency has changed. Automatic cataloging tool 124 may identify this change in the updated API specification. This change will also be reflected when the API specification is updated on the application exchange platform.

At 225, automatic cataloging tool 124 may generate an update package including the API specification with the metadata and the other documentation files. At 230, automatic cataloging tool 124 may transmit the update package to the application exchange platform. Automatic cataloging tool 124 may transmit this update package from exchange interface 126 to API cataloging service 112 via network 140. In some embodiments, instead of packaging the API specification content with metadata and/or other documentation files, automatic cataloging tool may transmit the portions of the API specification, metadata, and/or other documentation files that have changed. In this case, application exchange system 110 may publish the changed subject matter.

Figure 3:
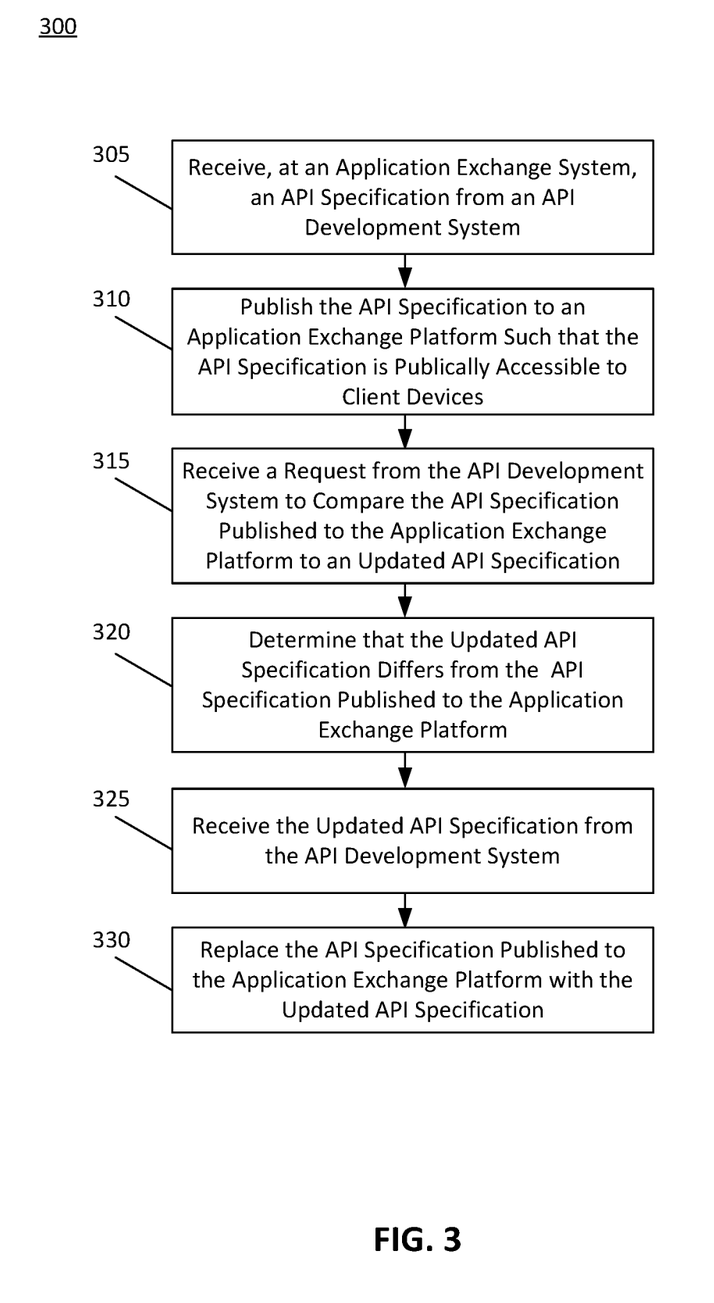
FIG. 3 depicts a flowchart illustrating a method for cataloging an API specification at an API exchange platform, according to some embodiments.

FIG. 3 depicts a flowchart illustrating a method for cataloging an API specification at an API exchange platform, according to some embodiments. Method 300 shall be described with reference to FIG. 1; however, method 300 is not limited to that example embodiment.

In an embodiment, application exchange system 110 may utilize method 300 to update an API specification that has been published on an application exchange platform. The foregoing description will describe an embodiment of the execution of method 300 with respect to application exchange system 110. While method 300 is described with reference to application exchange system 110, method 300 may be executed on any computing device, such as, for example, the computer system described with reference to FIG. 5 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 3, as will be understood by a person of ordinary skill in the art.

At 305, application exchange system 110 may receive an API specification from an API development system 120. Application exchange system 110 may receive the API specification via API cataloging service 112. The API specification may include content of the API specification, metadata, and/or other documentation files referenced in the API specification.

At 310, application exchange system 110 may publish the API specification to an application exchange platform such that the API specification is publically accessible to client devices. For example, application exchange system 110 may provide an application exchange platform allowing users to browse applications, APIs, and/or API specifications. Client devices may be user devices 130. Publishing the API specification may allow a user device 130 to access and/or view the API specification. In some embodiments, application exchange system 110 may also facilitate the installation and/or use of the corresponding API.

At 315, application exchange system 110 may receive a request from the API development system 120 to compare the API specification published to the application exchange platform to an updated API specification. In some embodiments, the request may be for application exchange system 110 to provide application development system 120 with the API specification, metadata, and/or other documentation files previously published. In this case, application exchange system 110 may provide this data to API development system 120. API development system 120 may then analyze an API specification to determine whether it has been updated or changed. API development system 120 may perform the validation of the API specification as described with reference to FIG. 2.

In some embodiments, application exchange system 110 may perform the comparison. In this case, application exchange system 110 may receive a potentially updated API specification. This may include API specification content, metadata, and/or other documentation files. In this case, application exchange system 110 may perform a comparison to determine if any of these API specification elements have changed from the API specification previously published.

At 320, application exchange system 110 may determine that the updated API specification differs from the API specification published to the application exchange platform. As previously explained, this determination may be made by application development system 120 and/or application exchange system 110. For example, if application development system 120 performs the comparison and determines that a difference exists, application development system 120 may transmit a message informing application exchange system 110 of the difference. API development system 120 may also transmit a message informing application exchange system 110 to expect an upload of an updated API specification. If application exchange system 110 performs the comparison and determines that the updated API specification differs, application exchange system 110 may have already received the updated API specification at 315. In this case, application exchange system 110 may publish the update API specification.

In some embodiments, if some additional API specification data is needed, application exchange system 110 may request this additional API specification data from application development system 120. For example, this may occur if hash comparisons are performed. API development system 120 may have provided a hash to application exchange system 110 to perform the comparison. Upon determining that the hash values differ, application exchange system 110 may request the updated API specification.

At 325, application exchange system 110 may receive the updated API specification the API development system 120. This may occur similar to the receiving at 305. In some embodiments, application exchange system 110 may transmit a message to API development system 120 to retrieve the updated API specification content, metadata, and/or other document files. In some embodiments, application exchange system 110 may be set to receive the updated API specification based on a determination at the API development system 120 that the API specifications differ.

At 330, application exchange system 110 may replace the API specification published to the application exchange platform with the updated API specification. In some embodiments, application exchange system 110 may remove the old API specification. In some embodiments, application exchange system 110 may provide a changelog and/or identify the changes implemented with the updated API specification. These changes and/or an indication of these changes may be viewed by the client devices when viewing the application exchange platform. Application exchange system 110 may modify the application exchange platform to display, indicate, and/or highlight the changes. Application exchange system 110 may or may not allow users to view old versions of the API specification.

Figure 4:
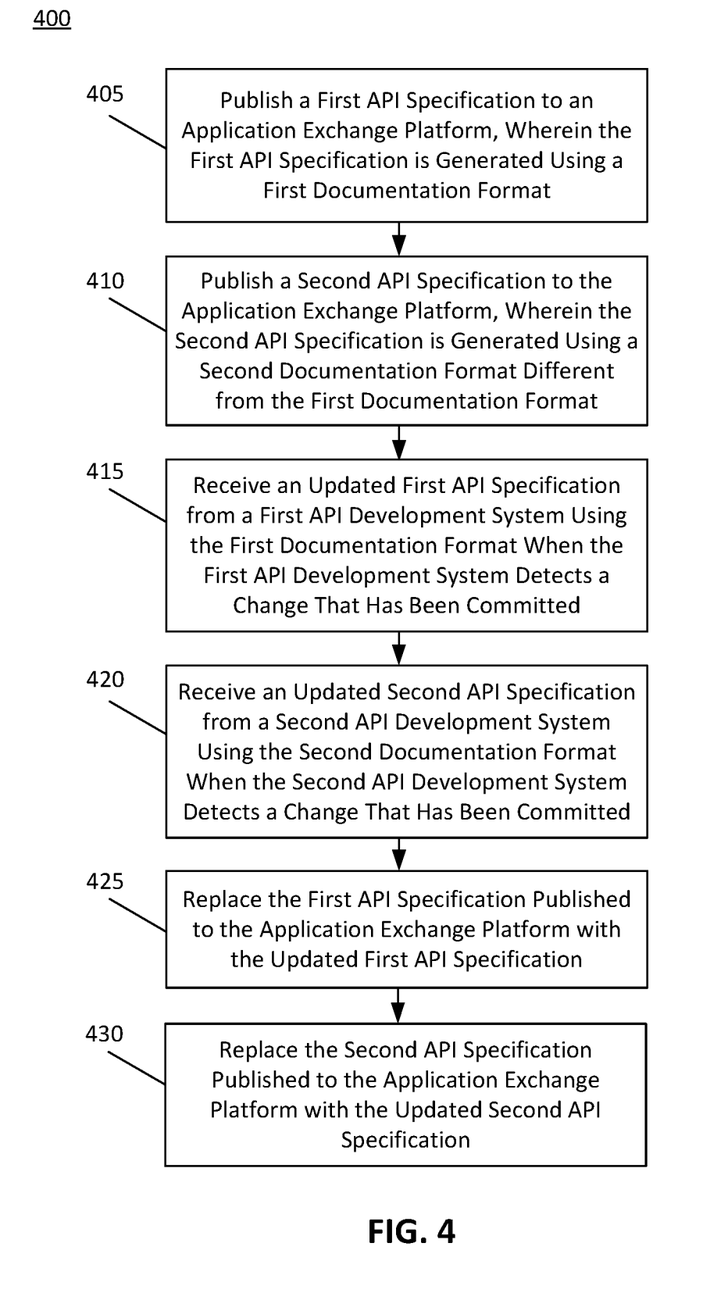
FIG. 4 depicts a flowchart illustrating a method for cataloging API specifications with different documentation formats, according to some embodiments.

FIG. 4 depicts a flowchart illustrating a method 400 for cataloging API specifications with different documentation formats, according to some embodiments. Method 400 shall be described with reference to FIG. 1; however, method 400 is not limited to that example embodiment.

In an embodiment, application exchange system 110 may utilize method 400 to update API specifications received from different API development systems 120 using different documentation formats. The foregoing description will describe an embodiment of the execution of method 400 with respect to application exchange system 110. While method 400 is described with reference to application exchange system 110, method 400 may be executed on any computing device, such as, for example, the computer system described with reference to FIG. 5 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 4, as will be understood by a person of ordinary skill in the art.

At 405, application exchange system 110 may publish a first API specification to an application exchange platform. The first API specification is generated using a first documentation format. For example, a first API development system 120A may use a first documentation format for developing an API and/or an API specification. This documentation format may correspond to a development platform and/or repository for generating the API and/or API specification. For example, different documentation formats may include GitHub, local files, API development cloud services, and/or other API development platforms. In some embodiments, application exchange system 110 may publish the first API specification preserving the first documentation format. In some embodiments, application exchange system 110 may modify the format to present a uniform API specification formatting within application exchange platform.

At 410, application exchange system 110 may publish a second API specification to the application exchange platform. The second API specification is generated using a second documentation format different from the first documentation format. For example, a second API development system 120$n$ may use a second documentation format for developing an API and/or an API specification. This may differ from the first documentation format. In this manner, application exchange system 110 may receive API specifications using different documentation formats.

At 415, application exchange system 110 may receive an updated first API specification from a first API development system 120A using the first documentation format when the first API development system 120A detects a change that has been committed. In this case, an automatic cataloging tool 124A at the first API development system 120A may detect the change. At 420, application exchange system 110 may receive an updated second API specification from a second API development system 120$n$ using the second documentation format when the second API development system 120$n$ detects a change that has been committed. An automatic cataloging tool 124$n$ at the first API development system 120$n$ may detect the change. In some embodiments, automatic cataloging tool 124A may be the same as automatic cataloging tool 124$n$. In this case, the automatic cataloging tool 124 may be agnostic to the particular documentation format used at an API development system 120. The automatic cataloging tool 124 and/or the application exchange system 110 may still identify updates to an API specification regardless of the documentation format used at a particular API development system.

At 425, application exchange system 110 may replace the first API specification published to the application exchange platform with the updated first API specification. At 430, application exchange system 110 may replace the second API specification published to the application exchange platform with the updated second API specification. These replacements may occur in a manner similar to 330 as described with reference to FIG. 3.

Figure 5:
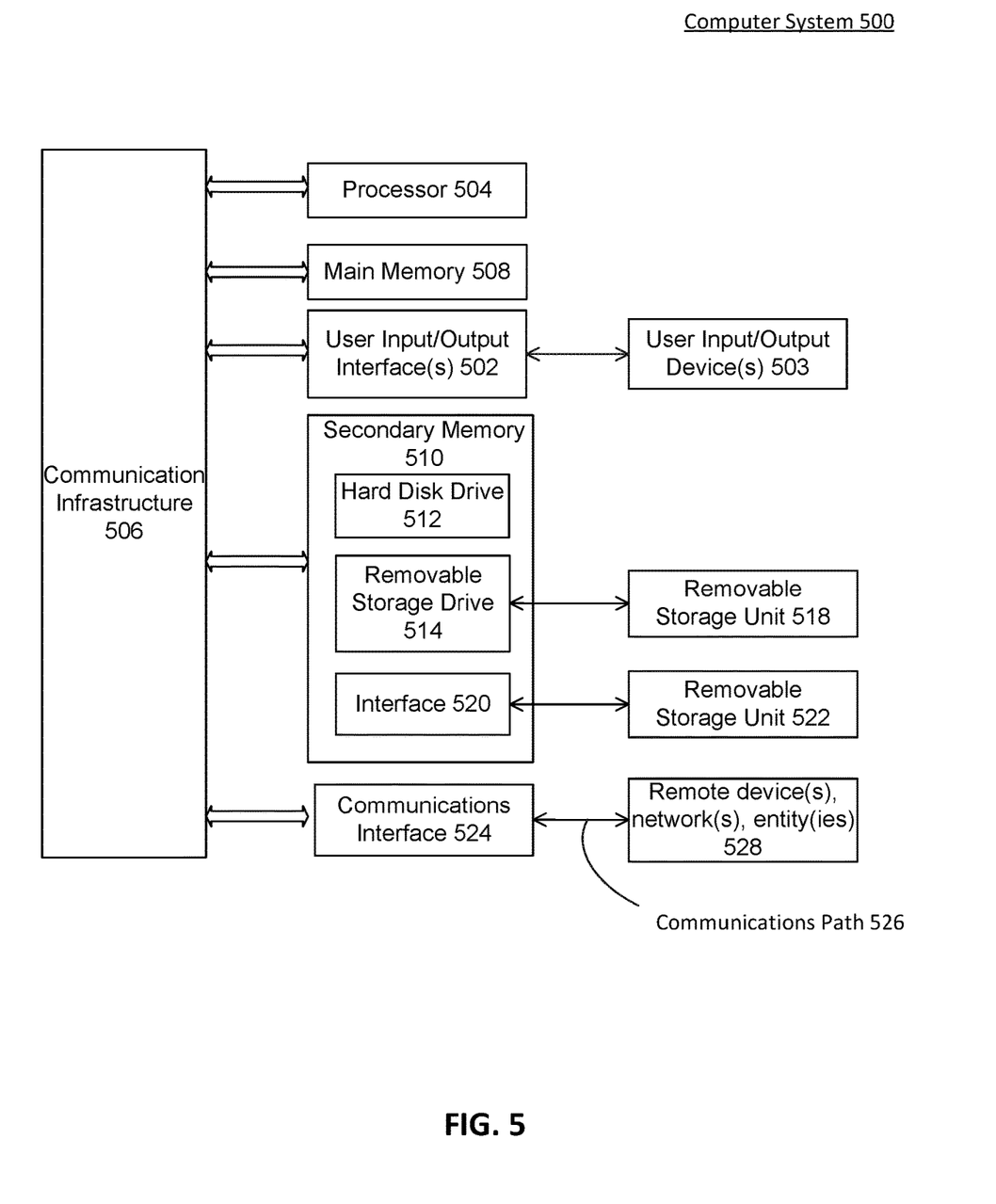
FIG. 5 depicts an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
   determining, by an automatic cataloging tool installed at an Application Programming Interface (API) development system, an API specification that is designated for automatic cataloging in a descriptor file that specifies a dependency tree of the API specification;
   identifying, by the automatic cataloging tool, a change in a file of the API specification in a particular folder of an API specification repository;
   in response to the determining, comparing, by the automatic cataloging tool, the API specification and the dependency tree to a published API specification that includes corresponding dependencies posted on an application exchange platform using a hash comparison to determine that the API specification differs from the published API specification; and
   when the API specification differs from the published API specification, transmitting, by the automatic cataloging tool, an update package comprising the API specification and the corresponding dependencies from the API specification repository to the application exchange platform, wherein the application exchange platform displays an identified change between the API specification and the published API specification, and wherein the application exchange platform is a cloud-based application marketplace that allows a customer to download the API specification.

2. The method of claim 1, wherein identifying the API specification further comprises:
   detecting, by the automatic cataloging tool, that the API specification has been stored in a folder designated by the API development system for automatic cataloging to the application exchange platform.

3. The method of claim 1, wherein comparing the API specification to the published API specification further comprises:
   assembling, by the automatic cataloging tool, a plurality of files corresponding to the API specification, wherein the plurality of files are stored on a plurality of repositories of the API development system.

4. The method of claim 1, wherein determining that the API specification differs from the published API specification further comprises:
   comparing, by the automatic cataloging tool, first metadata of the API specification to second metadata of the published API specification; and
   determining, by the automatic cataloging tool, that the first metadata of the API specification differs from the second metadata of the published API specification.

5. The method of claim 1, wherein determining that the API specification differs from the published API specification further comprises:
   comparing, by the automatic cataloging tool, a first file referenced in the API specification with a second file referenced in the published API specification, wherein the first file is an updated version of the second file;
   determining, by the automatic cataloging tool, that the first file differs from the second file; and
   designating, by the automatic cataloging tool, that the API specification differs from the published API specification.

6. The method of claim 1, wherein determining that the API specification differs from the published API specification further comprises:
   identifying, by the automatic cataloging tool, a plurality of files stored in the API specification repository forming the dependency tree referenced by the API specification;
   determining, by the automatic cataloging tool, that a file from the plurality of files has been modified relative to the published API specification; and
   designating, by the automatic cataloging tool, that the API specification differs from the published API specification.

7. The method of claim 1, wherein transmitting the API specification to the application exchange platform further comprises:
   packaging, by the automatic cataloging tool, the API specification with metadata and documentation files referenced in the API specification to generate the update package.

8. A non-transitory machine-readable storage medium that provides instructions that, if executed by a processor, are configurable to cause the processor to perform operations comprising:
   determining, by an automatic cataloging tool installed at an Application Programming Interface (API) development system, an API specification that is designated for automatic cataloging in a descriptor file that specifies a dependency tree of the API specification;
   identifying, by the automatic cataloging tool, a change in a file of the API specification in a particular folder of an API specification repository;
   in response to the determining, comparing, by the automatic cataloging tool, the API specification and the dependency tree to a published API specification that includes corresponding dependencies posted on an application exchange platform using a hash comparison to determine that the API specification differs from the published API specification, wherein the application exchange platform allows a customer to download an application corresponding to the API specification; and when the API specification differs from the published API specification, transmitting, by the automatic cataloging tool, an update package comprising the API specification and the corresponding dependencies from the API specification repository to the application exchange platform, wherein the application exchange platform displays an identified change between the API specification and the published API specification, and wherein the application exchange platform is a cloud-based application marketplace that allows the customer to download the API specification.

9. The non-transitory machine-readable storage medium of claim 8, wherein identifying the API specification further comprises:

detecting, by the automatic cataloging tool, that the API specification has been stored in a folder designated by the API development system for automatic cataloging to the application exchange platform.

10. The non-transitory machine-readable storage medium of claim 8, wherein comparing the API specification to the published API specification further comprises:

assembling, by the automatic cataloging tool, a plurality of files corresponding to the API specification, wherein the plurality of files are stored on a plurality of repositories of the API development system.

11. The non-transitory machine-readable storage medium of claim 8, wherein determining that the API specification differs from the published API specification further comprises:

comparing, by the automatic cataloging tool, first metadata of the API specification to second metadata of the published API specification; and determining, by the automatic cataloging tool, that the first metadata of the API specification differs from the second metadata of the published API specification.

12. The non-transitory machine-readable storage medium of claim 8, wherein determining that the API specification differs from the published API specification further comprises:

comparing, by the automatic cataloging tool, a first file referenced in the API specification with a second file referenced in the published API specification, wherein the first file is an updated version of the second file;

determining, by the automatic cataloging tool, that the first file differs from the second file; and designating, by the automatic cataloging tool, that the API specification differs from the published API specification.

13. The non-transitory machine-readable storage medium of claim 8, wherein determining that the API specification differs from the published API specification further comprises:

identifying, by the automatic cataloging tool, a plurality of files stored in the API specification repository forming the dependency tree referenced by the API specification;

determining, by the automatic cataloging tool, that a file from the plurality of files has been modified relative to the published API specification; and designating, by the automatic cataloging tool, that the API specification differs from the published API specification.

14. The non-transitory machine-readable storage medium of claim 8, wherein transmitting the API specification to the application exchange platform further comprises:

packaging, by the automatic cataloging tool, the API specification with metadata and documentation files referenced in the API specification to generate the update package.

15. A system, comprising:

a memory;

at least one processor coupled to the memory and configured to:

determine, by an automatic cataloging tool installed at an Application Programming Interface (API) development system, an API specification that is designated for automatic cataloging in a descriptor file that specifies a dependency tree of the API specification;

identify, by the automatic cataloging tool, a change in a file of the API specification in a particular folder of an API specification repository;

in response to the determining, compare, by the automatic cataloging tool, the API specification and the dependency tree to a published API specification that includes corresponding dependencies posted on an application exchange platform using a hash comparison to determine that the API specification differs from the published API specification, wherein the application exchange platform allows a customer to download an application corresponding to the API specification; and when the API specification differs from the published API specification, transmit, by the automatic cataloging tool, an update package comprising the API specification and the corresponding dependencies from the API specification repository to the application exchange platform, wherein the application exchange platform displays an identified change between the API specification and the published API specification, and wherein the application exchange platform is a cloud-based application marketplace that allows the customer to download the API specification.

16. The system of claim 15, where to identify the API specification, the at least one processor is further configured to:

detect, by the automatic cataloging tool, that the API specification has been stored in a folder designated by the API development system for automatic cataloging to the application exchange platform.

17. The system of claim 15, wherein to compare the API specification to the published API specification, the at least one processor is further configured to:

assemble, by the automatic cataloging tool, a plurality of files corresponding to the API specification, wherein the plurality of files are stored on a plurality of repositories of the API development system.

18. The system of claim 15, wherein to determine that the API specification differs from the published API specification, the at least one processor is further configured to:

compare, by the automatic cataloging tool, first metadata of the API specification to second metadata of the published API specification; and determine, by the automatic cataloging tool, that the first metadata of the API specification differs from the second metadata of the published API specification.

19. The system of claim 15, wherein to determine that the API specification differs from the published API specification, the at least one processor is further configured to:

compare, by the automatic cataloging tool, a first file referenced in the API specification with a second file referenced in the published API specification, wherein the first file is an updated version of the second file;

determine, by the automatic cataloging tool, that the first file differs from the second file; and designate, by the automatic cataloging tool, that the API specification differs from the published API specification.

20. The system of claim 15, wherein to determine that the API specification differs from the published API specification, the at least one processor is further configured to:

Identify, by the automatic cataloging tool, a plurality of files stored in the API specification repository forming the dependency tree referenced by the API specification;

determine, by the automatic cataloging tool, that a file from the plurality of files has been modified relative to the published API specification; and designate, by the automatic cataloging tool, that the API specification differs from the published API specification.

* * * * *

UNITED STATES PATENT AND TRADEMARK OFFICE
CERTIFICATE OF CORRECTION

PATENT NO. : 11,977,862 B2
APPLICATION NO. : 17/527274
DATED : May 7, 2024
INVENTOR(S) : Battaglia et al.

It is certified that error appears in the above-identified patent and that said Letters Patent is hereby corrected as shown below:

On the Title Page

Item (54) and in the Specification, Column 1, Line 3, after "(API)" insert -- SPECIFICATIONS --.

Signed and Sealed this
Second Day of July, 2024

Katherine Kelly Vidal
*Director of the United States Patent and Trademark Office*